Sept. 13, 1960 P. M. BOURDON 2,952,842
SAFETY DEVICE FOR AUTOMATIC GUIDING OF ROAD VEHICLES
Filed May 9, 1956 8 Sheets-Sheet 1

INVENTOR
PIERRE MARCEL BOURDON
BY
HIS ATTORNEYS

Sept. 13, 1960   P. M. BOURDON   2,952,842
SAFETY DEVICE FOR AUTOMATIC GUIDING OF ROAD VEHICLES
Filed May 9, 1956   8 Sheets-Sheet 3

INVENTOR
PIERRE MARCEL BOURDON
BY
HIS ATTORNEYS

Sept. 13, 1960 P. M. BOURDON 2,952,842
SAFETY DEVICE FOR AUTOMATIC GUIDING OF ROAD VEHICLES
Filed May 9, 1956 8 Sheets-Sheet 5
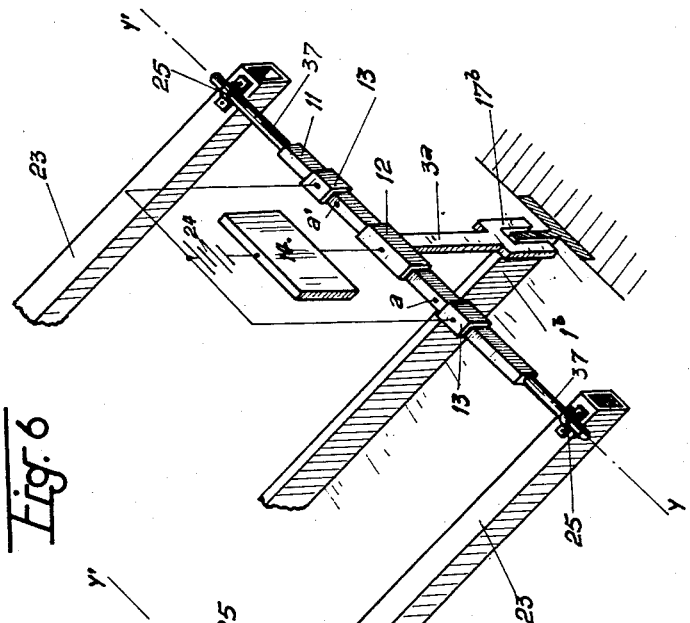
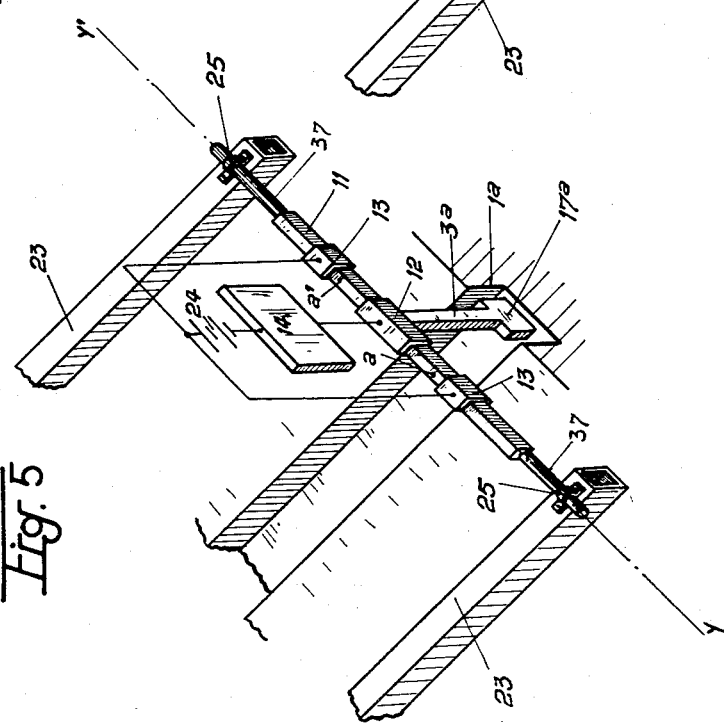
INVENTOR
PIERRE MARCEL BOURDON
BY
HIS ATTORNEYS Sept. 13, 1960 P. M. BOURDON 2,952,842
SAFETY DEVICE FOR AUTOMATIC GUIDING OF ROAD VEHICLES
Filed May 9, 1956 8 Sheets-Sheet 6
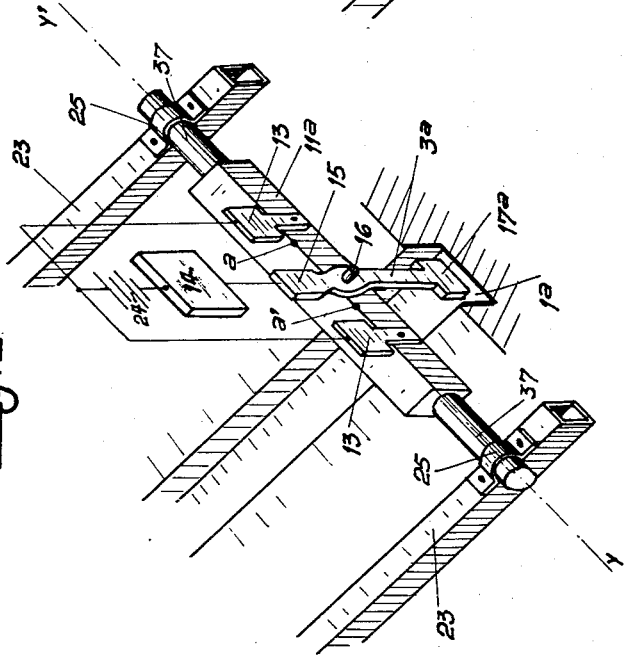
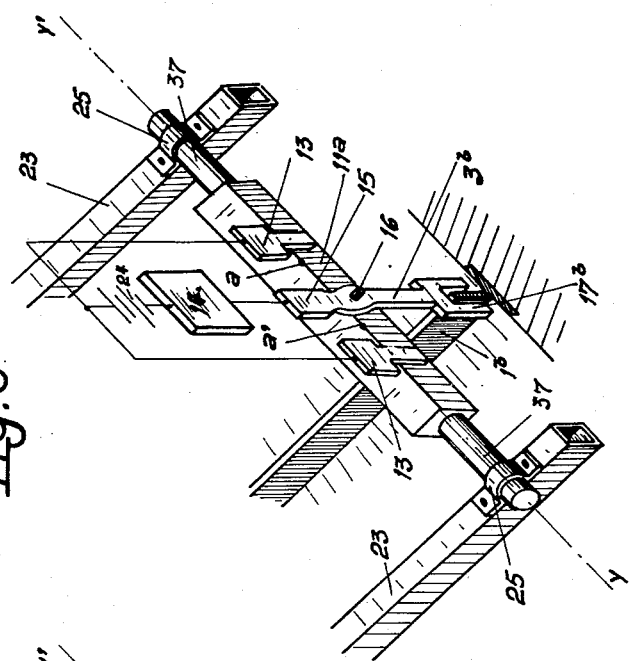
INVENTOR
PIERRE MARCEL BOURDON
BY
HIS ATTORNEYS Sept. 13, 1960 P. M. BOURDON 2,952,842
SAFETY DEVICE FOR AUTOMATIC GUIDING OF ROAD VEHICLES
Filed May 9, 1956 8 Sheets-Sheet 7

INVENTOR
PIERRE MARCEL BOURDON
B:
HIS ATTORNEYS

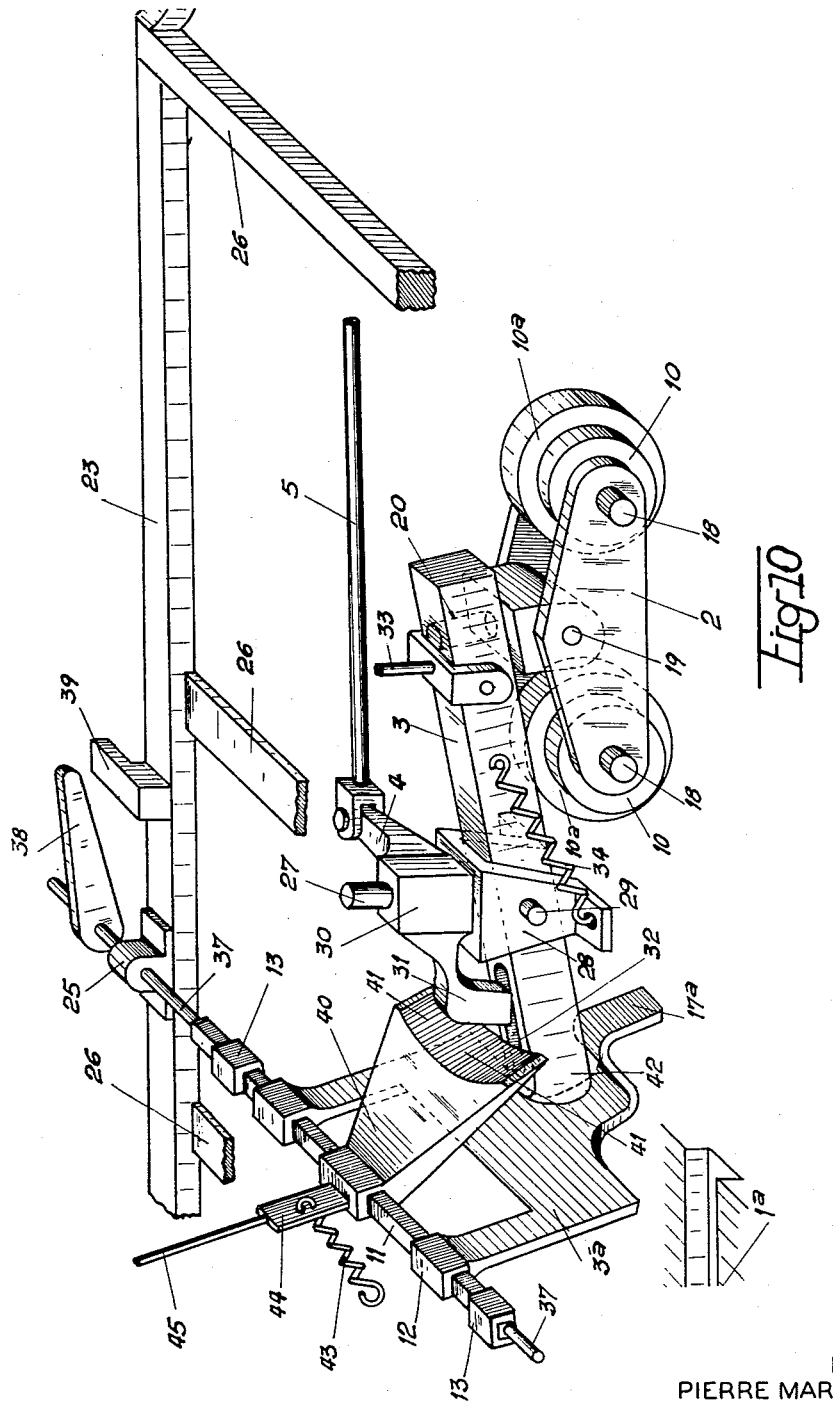

United States Patent Office 2,952,842
Patented Sept. 13, 1960

2,952,842
SAFETY DEVICE FOR AUTOMATIC GUIDING OF ROAD VEHICLES

Pierre Marcel Bourdon, Paris, France, assignor to Compagnie Generale des Etablissements Michelin (Robert Puiseux & Cie), Clermont-Ferrand, France Filed May 9, 1956, Ser. No. 583,798

Claims priority, application France May 12, 1955

5 Claims. (Cl. 340—282)

There are cases in which it is desired to guide road vehicles very precisely. This is particularly the case when urban traffic problems lead to the construction of relatively short subways or viaducts in or over which pass trolleybuses or omnibuses so as to avoid in the more crowded parts of towns the traffic upset which could be caused by the circulation of such vehicles at ground level. In such cases, in order that these subways or viaducts may be as narrow as possible, for obvious reasons of economy, the vehicles must be guided very precisely and closely in order to avoid their colliding with the walls or with each other in the case of two-way traffic.

Automatic steering devices are known. These comprise essentially a "reference track" in the form of a rib or dwarf wall projecting from the ground, an overhead wire or cable, a channel in the ground, etc. and a rod or similar member guided by the reference track and acting through appropriate means, mechanical, electrical, etc., on the steerable wheels of the vehicle.

Experience shows that such automatic steering devices can accidentally fail to operate. For example, because the rod leaves the reference track or the rod breaks or the connection between the rod and the wheels is damaged. In that case the vehicle, left to its own devices, can lead to serious accidents.

The invention relates to safety means which, should the vehicle depart substantially from its assigned course, bring automatically into operation a warning device or a device for interrupting the drive of the vehicle and stopping it.

The invention is concerned with the case in which the reference track is formed essentially by a narrow slot in the ground of U-shaped cross-section and defined, for example by a bent strip of sheet metal embedded in the ground. The vehicle then has underneath its chassis a feeler in the form of a short oblique rod fixed to a vertical pivot turning within the vehicle and carrying at its end a small carriage or slide (hereinafter referred to as a "trolley") which rolls or slides within the slot. The rotation of that rod about its vertical pivot act, through any suitable mechanism which may, for example, be mechanical or electrical, on the inclination of the wheels so as to maintain the vehicle on the desired course.

An embodiment of the invention and a number of modifications are shown diagrammatically by way of example in the accompanying drawings, in which:

Figure 5 shows in perspective one manner of mounting the guide rod suitable for the case in which the reference track is hollow.

Figure 6 is a similar view suitable for the case in which the track is in relief.

Figure 9:
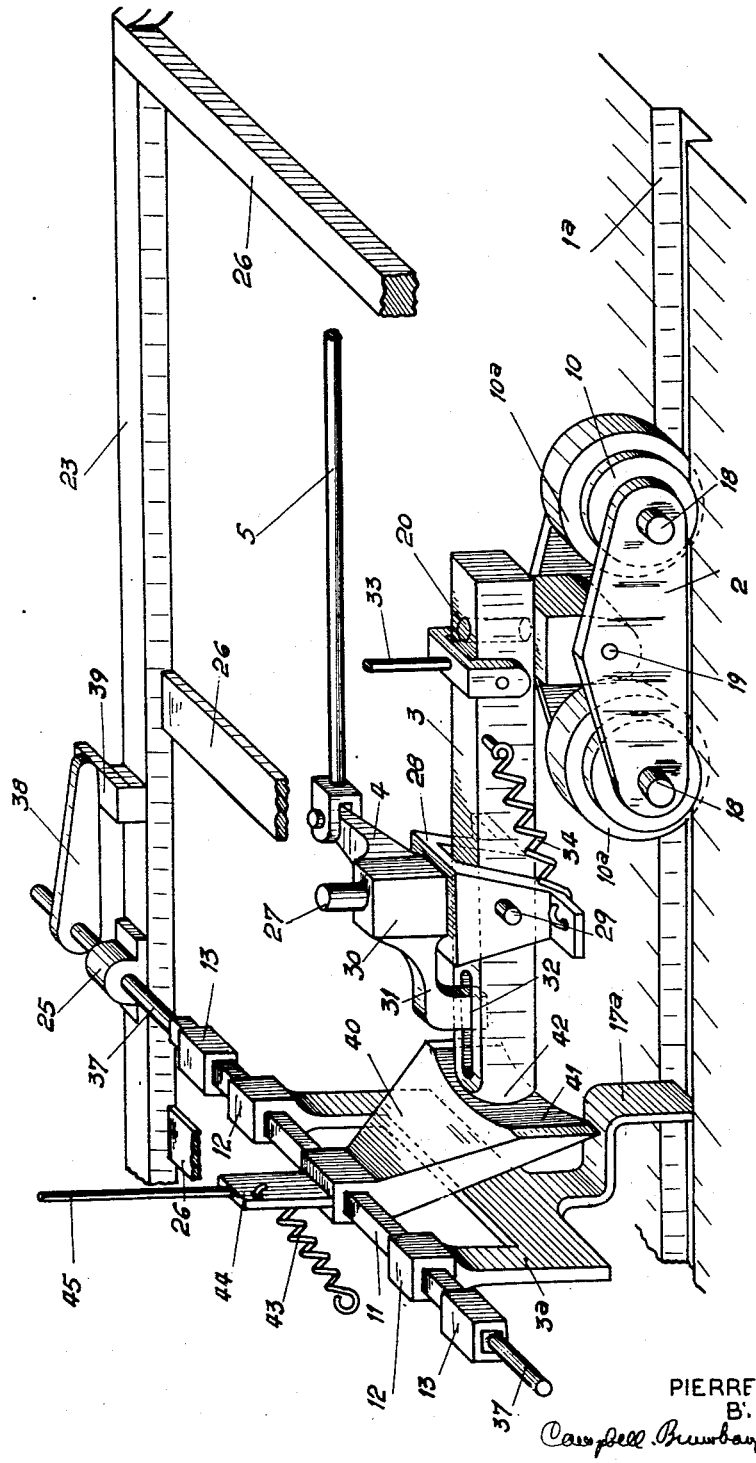

Figures 7 and 8 are views corresponding to Figures 5 and 6 of a second manner of mounting the guide rod; and Figures 9 and 10 are perspective views of the guide system proper and the safety device in the working and idle positions respectively.

The invention is based on the following observations made with reference to Figures 1–4 in which the fixed points of the mechanism are indicated by black dots and the movable joints by circles.

In these figures, 1 is the reference track with a radius R and a center O, 3 a rod guided by the track and pivotally mounted on a vertical stud carried by a transverse bearer of the vehicle and acting, through a suitable mechanism such as a directional servo (not shown) on the steering wheels 9 so as to subject them to the movements which are necessary for the vehicle to be guided along the reference track. The axis X'X of the vehicle moves in the direction of the arrow V. When the vehicle travels along a straight course, the axis X'X remains coincident with the reference track. If, however, the vehicle travels round a bend, the axis X'X intersects the reference track at two points A, B for any given position of the vehicle along the bend. It can be shown geometrically (Figure 1) that whatever may be the radius R of the reference track, the points A and B are fixed on the axis X'X of the vehicle. Indeed, If C is the vertical pivotal axis of the rod 3, D the point of contact of the rod with the reference track 1, H the intersection of the axis of the vehicle and the rear axle, I the pivot point of the front axle relatively to the vehicle axis and if $c$ is the distance HC, $d$ the length of the horizontal projection CD of the rod 3 and $l$ the distance HI, the following equations will be true of the triangles AOH, COD and COH:

$$OA^2 = AH^2 + OH^2$$
$$OD^2 = OC^2 + CD^2$$

and substituting in above gives:

$$OC^2 = OH^2 + HC^2$$
$$OD^2 = OH^2 + HC^2 + CD^2$$

and, therefore, $$AH^2 = HC^2 + CD^2 = c^2 + d^2$$

Also, as OH is at right angles to X'X, $$HA = HB$$

The position of the points A and B on the curve 1 therefore depends on that of the point C. The position of point C must be such that the angle OCD is a right angle. Then, if $\alpha$ is the angle made by CD (projection of the rod 3) with X'X (angle proportional to the radius R of the track 1), $\theta$ the angle made by the front steering axle with the perpendicular to X'X at I (angle such that the vehicle turns about the centre O of the track 1), the following equations are true of the triangles OHI and OHC:

$$\tan\left(\frac{\pi}{2} - \theta\right) = \frac{OH}{l}$$

$$\tan\left(\frac{\pi}{2} - \alpha\right) = \frac{OH}{c}$$

therefore, $$\tan\theta = \frac{l}{OH}$$

and $$\tan\alpha = \frac{c}{OH}$$

whence $$\frac{\tan \alpha}{\tan \theta} = \frac{c}{l} \quad (1)$$

If Equation 1 is satisfied, the point C is on X'X, the angle COH is equal to $\alpha$ and the points A and B are fixed on X'X as $c$ and $d$ are fixed.

Figure 3:
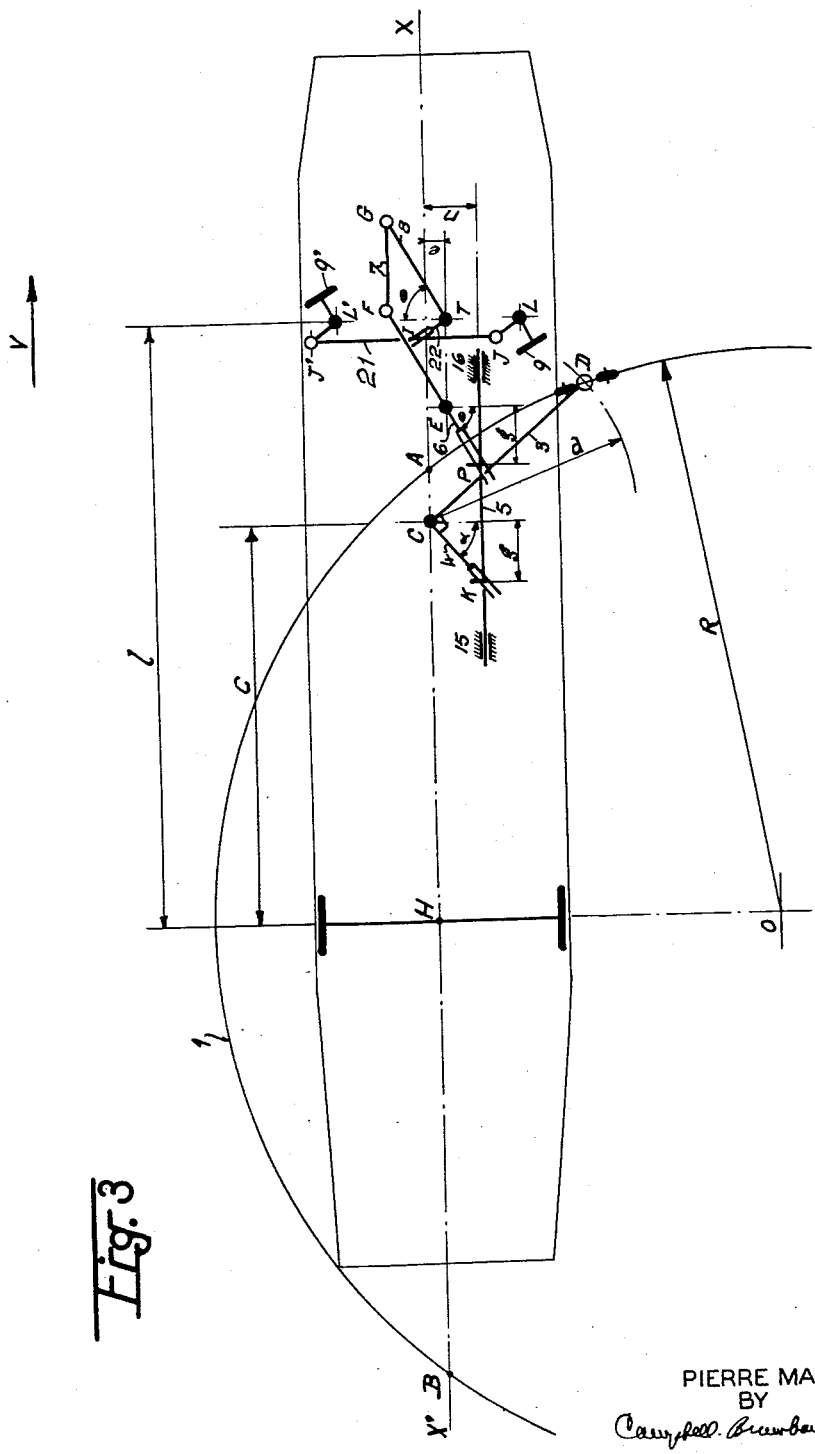
Figure 4:
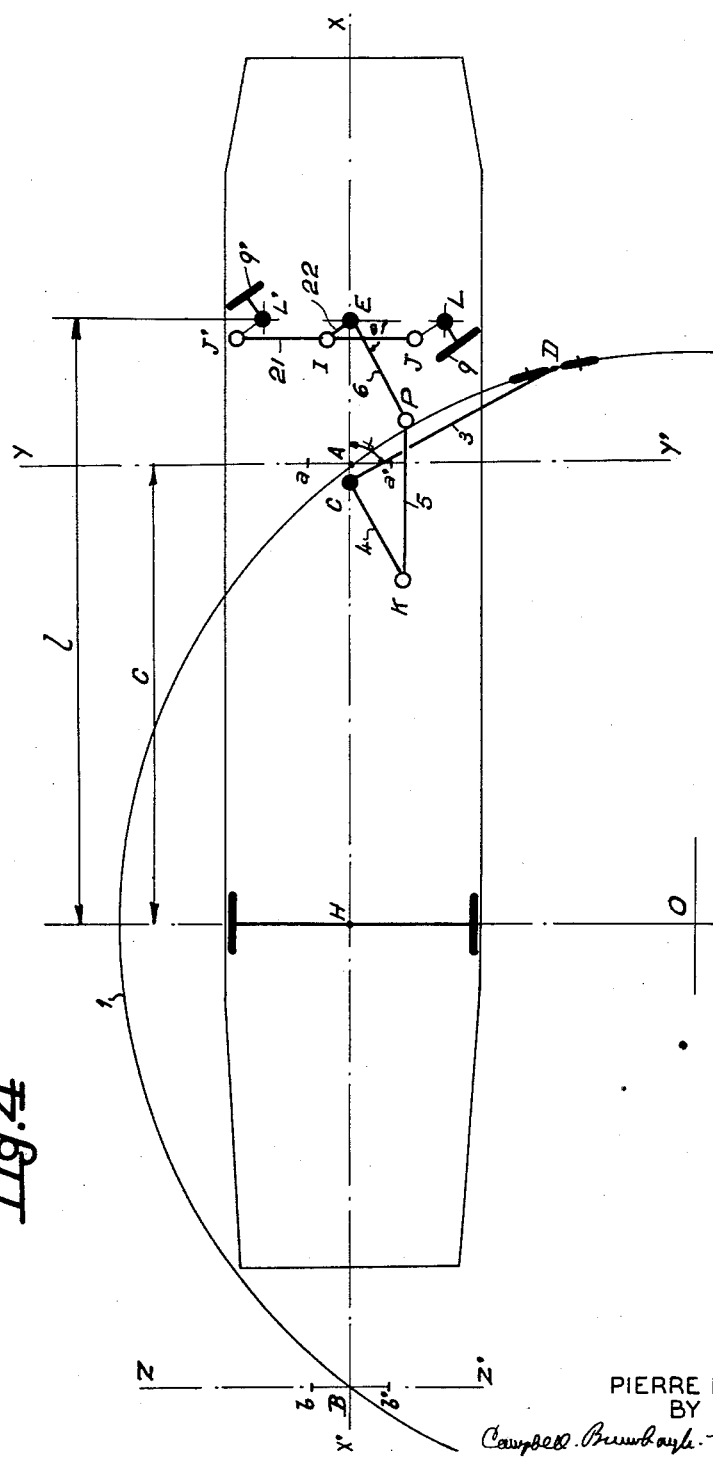

Conversely, the lengths $c$, $d$ and $l$ being fixed, the Equation 1 can be easily satisfied, that is to say, to cause the wheels 9 to turn at an angle $\theta$ when the rod 3 turns through an angle $\alpha$. For that purpose, one of the arrangements shown in Figures 2–4 is used.

Figure 1:
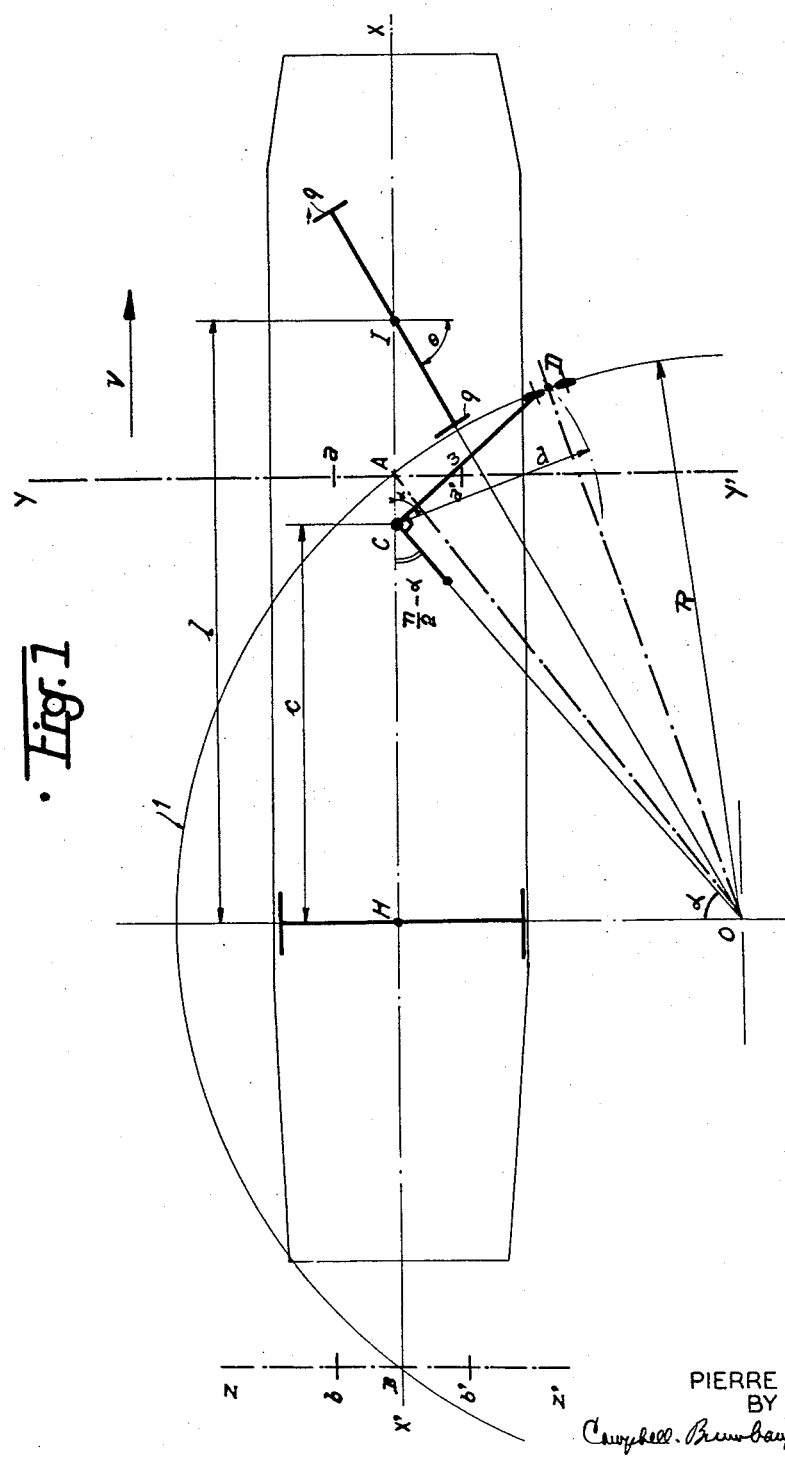
Figure 1 is a plan of a vehicle steered by its front wheels showing the vehicle traveling round a bend of radius R, the reference track and the rod guided by the track.
Figure 2:
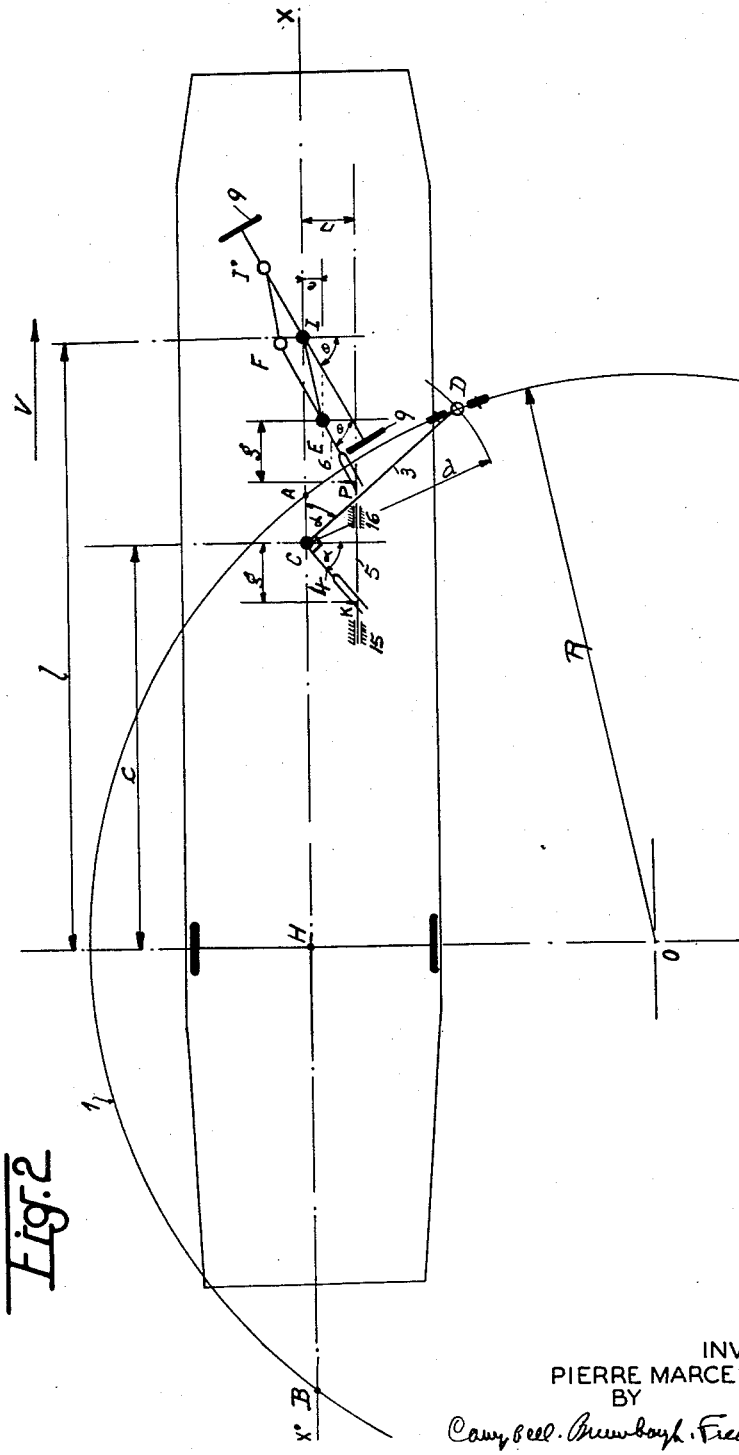
Figures 2–4 show three examples of arrangements for transmitting movement of the guide rod to the wheels.

In Figure 2, a rod 4 integral with CD the end of which rod drives, through a fork K, a rod 5 which slides in guides 15, 16 parallel to X'X. The rod 4 is disposed at right angles to the rod 3.

A rod 6 is arranged to turn about a fixed point E in the vehicle and carries at its end a fork P driven by the rod 5.

If the rod 3 turns through an angle $\alpha$, the rod 4 integral with it turns through the same angle and causes the rod 5 to slide over a distance $g$. The distance $g$ is equal to the projection of CK (rod 4) on the rod 5. It is also obviously equal to the projection of EP on that same rod 5 since the points of contact of the forks K and P, respectively, are fixed on the rod 5. If $e$ is the distance from the point E to the axis X'X and $n$ the distance from the rod 5 to that axis, the rod 6 turns through an angle $\theta$ given by the equation $$\frac{\tan \alpha}{\tan \theta} = \frac{n-e}{n}$$

which is derived from the fact that in the right angled triangles shown in Figure 2, $$\tan \alpha = \frac{g}{n}$$

$$\tan \theta = \frac{g}{n-e}$$

If therefore the lengths $n$ and $e$ are chosen so that $$\frac{n-e}{n} = \frac{c}{l}$$

then, $$\frac{\tan \alpha}{\tan \theta} = \frac{c}{l}$$

that is to say, that the angles $\alpha$ and $\theta$ will satisfy the geometrical condition (1) set out above.

It suffices therefore that the steering wheels be turned through the same angle as the rod EP (rod 6) in order that the points at which the reference curve 1 meets the axis X'X of the vehicle may remain fixed whatever may be the radius of the curve.

The transmission of the movement of the rod 3 to the steering wheels can be effected in various ways. When it is effected through a linkage, the latter can be in the form of a number of articulated parallelograms.

In the case of Figure 2, it is assumed that the wheels 9 are connected together by a rigid axle which pivots about a fixed point I on the axis X'X of the vehicle and integral with the chassis. It has been seen above how the rod 3 acts on the rod 6. The latter, in turn, actuates an articulated parallelogram. A second side is formed by the extension EF of the rod 6; a third by a rod I—I' of the axle; and the last by a connecting rod FI'. The points F and I' are movable joints.

It follows clearly from Figure 2 that when the rod 3 turns about the point C, the rod 4 driving the rod 5 through the fork K, the rod 6 transmits movement to the articulated parallelogram EFI'I which causes the axle and the wheels 9 to turn about the point I by the desired amount.

In the case of Figure 3 it is assumed that the steering wheels 9' are independent and are pivoted each at a fixed point L or L' in the chassis of the vehicle. The axles of the wheels 9' are connected at L and L' in known manner to connecting rods which are pivotally connected at J and J' to a coupling rod 21. In that case, the linkage connecting the rod 3 to the coupling rod 21 comprises in addition to the rods 4, 5 and 6, an extension EF of the rod 6 which is pivotally connected at F to a rod 7 parallel to the axis X'X, the rod 7 being pivotally connected at G to a rod 8 parallel to the rod 6. The rod 8 is pivotally connected at T to a rod 22 connected by a fork I to the rod 21. The point T is fixed to the chassis of the vehicle. It is at the same distance as the point E from the axis X'X and on the straight line LL' joining the pivots of the axles of the wheels 9. It can be clearly seen in Figure 3 that the axes of the wheels 9 are parallel to the rod 8, that is to say make an angle $\theta$ with the perpendicular to the axis X'X.

In the case of Figure 4 which is that of independent front wheels 9' mounted as in Figure 3 and in which also it is assumed that tan $\alpha$=tan $\theta$, as will be seen further on, the linkage is simplified. The rod 5 is simply pivotally connected at K to the rod 4 and at P to the rod 6. The rod 5 remains parallel to X'X and the point E is, here, fixed on the axis X'X. The rod 22 is then pivotally connected at I to the coupling rod 21.

Another suitable transmission such as a gear could be used for transmitting the rotary movement of the rod 6 to the steering wheel 9 or 9'.

The position of the points A and B on the longitudinal axis X'X of the vehicle, as has been shown, depends only on the lengths $c$ and $d$. It is therefore possible, by giving those lengths suitable values, to make the points A and B coincide with positions at which a safety device can be easily installed which will come into action should the automatic guide system to be described presently not be working properly.

Indeed, if one departs slightly from the condition $$\frac{\tan \alpha}{\tan \theta} = \frac{c}{l}$$

the points A and B, while not being strictly fixed on X'X, will be displaced therefrom by only very small amounts to one or the other side of the axis X'X for curves of any usual radius.

For example, if it is assumed that the rotary movement of the rod 3 is transmitted to the wheels through a parallelogram linkage of the type shown in Figure 4 and in which tan $\alpha$=tan $\theta$, the reference curve will no longer always meet the axis X'X at fixed points A and B irrespective of the radius of curvature.

If Y'Y and Z'Z are the perpendiculars to the axis X'X at the points A and B, the reference curves will meet those perpendiculars respectively between the points $a$ and $a'$ and the points $b$ and $b'$.

It can be calculated in that case that for a vehicle having a 6 metre wheel base ($l$=6 m.) following curves in which $R>6$ m., the distances of the points $aa'$ and $bb'$ from the axis X'X will not exceed 20 mm., provided of course that the points A and B are suitably chosen.

If, therefore, the displacement of the intersection of the reference track 1 and the axes Z'Z and Y'Y exceeds a given value (which can be determined for any vehicle either experimentally or by calculation), it is because there necessarily exists an abnormal condition such as incorrect operation of the guiding device or failure thereof.

In accordance with the invention, the above described relationship is used in the provision of a safety device. Figures 5 to 8 show two embodiments of the safety device.

In the case of Figures 5 and 6, a square section bar 11 terminating in two cylindrical portions 37 disposed along the axis Y'Y is supported in bearings 25 so that it can rotate relatively to two longitudinal beams 23 of the vehicle chassis. A member 12 is mounted to slide on the bar 11, being guided by the reference track. The latter is in the form of a groove 1a in the case of Figure 5 and the rod 3a terminates in a head 17a (preferably, in practice, a roller will be provided for reducing friction). In the case of Figure 6, the track 1b is in relief (for example, in the form of a rail) and the rod 3a terminates in a fork 17b. (Here, again, in practice, a system of rollers will preferably be provided for reducing friction.) In both cases, as has been seen, the sliding member 12 does not normally go beyond the points a and a' on the rod 11. According to the invention, stops 13 are arranged slightly beyond the points a and a'.

If the sliding member 12 touches one of the stops 13, that is an indication that the guiding is not operating normally and, therefore, that a stopping mechanism or warning device must be brought into action.

That result is obtained, in a manner known in itself, for example by means of an electric circuit closed by the contacts 12 and 13 and which includes an alarm 14 in the form either of a simple warning device or an emergency brake actuator for automatically stopping the vehicle. In this case, the rod 11 must, of course, be of insulating material while the parts 12 and 13 are of conducting material. Also, the circuit must include a source of current 24.

The sliding member can be replaced by a pivoted device as shown in Figures 7 and 8.

In that case, a square section transverse member 11a the cylindrical ends 37 of which are preferably mounted to rotate in bearings 25 carried by two longitudinal bearers 23 of the chassis supports a stud 16 on which is pivotally mounted a rod 3b the lower end of which is constrained to follow the reference track, either because it engages at 17a in a slot 1a (Figure 7) or because it embraces at 17b a projecting member 1b (Figure 8).

The upper part 15 of the rod 3b travels between the two stops 13 which are suitably disposed as in the preceding case so that in normal operation, the part 15 never comes into contact with the stops 13.

Should the guiding device not be functioning normally, the part 15 will come into contact with the stops 13 and, as previously indicated, closes an electric circuit which, through the device 14 issues a warning or stops the vehicle. In that case the transverse member 11a is also of insulating material while the parts 15 and 13 are of conducting material. The electric circuit includes a source of current 24.

By providing the cylindrical ends 37 of the bar 11a with suitable control members the assembly 3a, 12 or 3b, 15 can be caused to turn about a transverse axis of the vehicle in order to withdraw the assembly when it is no longer required, that is to say when the vehicle is being manually steered.

In all the above, it has been assumed that the safety device is incorporated in the automatic guiding system. In practice, however, that presents certain difficulties. It is therefore preferable to separate the two mechanisms and to use for the automatic guiding a special trolley mounted on wheels or rollers and connected to the safety device so that it can be operated at the same time as the latter.

In Figures 9 and 10 a guiding trolley has been shown by way of example associated with a safety device of the kind shown in Figure 5. These figures also show how the lifting or withdrawal of the guiding system and the safety device can be effected so as to allow normal road circulation with manual steering of the vehicle.

The guiding system proper is mounted beneath the vehicle, a longitudinal bearer 23 and three transverse bearers 26 of which are shown. It comprises a trolley having a frame 2 which supports a pair of rollers 10 turning on studs 18. These rollers have a central guiding enlargement 10a which engages in the gutter of the guide rail 1a.

The frame 2 is connected by a universal joint at the end of a lever 3 having a horizontal pivot 19 and a vertical pivot 20 so that the frame can take up inclinations in all directions relatively to the lever 3. The rollers 10 can therefore bear constantly on the guide rail 1a and they remain always tangential to the rail. The rollers are thus prevented from making with the rail an angle which might lead to derailment, as is well known in railway technique.

The lever 3 is mounted beneath the vehicle as follows: beneath the vehicle there is fixed, for example to a transverse bearer 26, a stud 27 on which turns a part 28 carrying at its lower end a fork through which passes a horizontal pin 29 on which the lever 3 is pivotally mounted.

On the same vertical stud 27 there is pivotally mounted another part 30 which carries a lever 4 connected by a rod 5 to the mechanism for steering the wheels 9 of the vehicle.

This steering mechanism, not shown in detail in Figures 9 and 10, is of one of the types described in principle with reference to Figures 2–4.

Also, the part 30 carries a cranked lever 31 which can engage in a slot 32 formed in the end of the lever 3 remote from the trolley.

When the trolley is in the lowered position as shown in Figure 9, that is to say, when the vehicle is being steered automatically by the guide rail 1, the slot 32 in the lever is engaged by the lever 31 of the part 30 and any rotation of the lever 3 round the vertical stud 27 results in rotation of the part 30 and therefore, acts on the wheels 9 through the linkage described above.

To pass from automatic to manual steering, the trolley is raised by means of a rod 33 which passes through the floor of the vehicle (not shown) and which can be actuated by the driver or automatically in, for example, the manner described in the U.S. patent application Serial No. 583,817, filed May 9, 1956, entitled Automatic Guiding of Road Vehicles and assigned to the assignee of the present invention.

The rod 33 has at its lower end a fork 35 which is connected to the lever 3 by a horizontal pin passing through an appropriate hole in that lever. The slot 32 is then lowered and is disengaged from the lever 31. It then becomes possible to orient the wheels 9 without having at the same time to move the lever 3 and its trolley which remain at rest in a space (not shown) provided beneath the vehicle.

It is of course clear that the clutching system between the lever 3 and the part 30 could be effected differently. For example, the slot could be formed in the part 30 and receive the end of the lever 3.

Two springs 34 bearing on the lever 3 and on the part 28 can be provided so as to increase the pressure of the rollers 10 on the guide rail 1a.

Also, the safety device comprises a part 17a which can slide along the reference track or guide rail behind the trolley 2. The safety member is preferably formed as shown in Figure 9, that is to say, comprises two parts 3a, 17a which are vertical in the guiding position and which are connected by a part which is substantially horizontal in the guiding position, so as to bring the safety member as near as possible to the steering member. The part 3a is hollow as can be seen and has two enlarged portions 12 through which it is mounted to slide on a horizontal transverse bar 11 of the vehicle. That bar, which may be of square section as shown or of circular section grooved so as to prevent rotation of the parts 12 relatively to the bar 11, has two cylindrical end portions 37 mounted to rotate in bearings 25 (only one is visible in Figures 9 and 10) carried by the longitudinal bearers 23 of the vehicle chassis. Beyond at least one of the bearings 25, the shaft 37 has keyed to it a lever 38 which can cooperate with a stop 39 carried by the corresponding longitudinal member 23 so as to limit the rotation of the shaft 37 member 23 so as to limit the rotation of the shaft 37 to the position corresponding to the vertical position of the part 3a, 17a.

Further, between the enlargements 12 there is keyed to the bar 11 a part 40 the lower end 41 of which is part-spherical and bears against the end 42 of the lever 3 which is correspondingly rounded. A spring 43 anchored to an upper extension 44 of the part 40 and to a transverse bearer 26 of the chassis (only partly visible in Figures 9 and 10 for greater clearness) urges the parts 41 and 42 into contact with each other.

Moreover, as already described, the bar 11, 37 has two fixed stops 13 disposed a little beyond the limits of normal oscillation of the part 3a, 17a along the transverse bearer 11 when the part 17a is displaced transversely to the vehicle while following the reference track 1a. The bar 11, 37 is of insulating material and the stops 13 and the part 3a of conducting material. The stops 13 are connected in parallel to one terminal of a source of current (not shown) of which the other terminal is connected to a one terminal of an alarm signalling device (also not shown). The part 3a is connected to the second terminal of the latter device in the manner shown in Figure 5. Consequently, the electric circuit is closed and the alarm signal is given when the part 3a touches one of the stops 13.

The extension 44 of the part 40 carries a rod 45 which passes through the floor (not shown) of the vehicle through a suitable slot and extends to within reach of the driver's hand, as does the previously mentioned rod 33. That rod serves to cause the safety device and the guiding system to descend when it is desired to pass from manual to automatic steering.

The operation of the mechanism will be clear from the preceding description. During automatic steering, the rollers 10 and the part 17a are in engagement with the guide rail 1a. The engagement of the parts 31 and 32 ensures the transmission of the movements of the trolley to the steering wheels as described above. On the other hand, the engagement of the parts 41 and 42 ensures the connection between the guiding system and the safety device.

The part 3a, 12 slides freely on the shaft 11 following the curves of the guide rail 1a. If, for any reason, the vehicle ceases to follow the reference track 1a, one of the enlargements 12 comes into contact with one of the stops 13 and sets off the alarm signal.

When it is desired to pass from automatic to manual steering, it is necessary only to raise the feeler by acting on the rod 33. The rear end 42 of the lever 3 is thus lowered and passes beneath the part 41. The latter, under the action of the spring 43, pivots and positions itself above the lever 3 which is thus maintained in the raised manual steering position (Figure 10).

When it pivots, the part 40 takes the shaft 11, 37 with it and the latter takes with it the part 3a, 12, 17a the lower end 17a of which rises and disengages itself from the guide rail 1a.

When it is desired to re-institute automatic steering, it is necessary only to pull forward the rod 45 which causes the shaft 11, 37, the part 3a and the part 40, 41 all to pivot. As the lever 3 is no longer supported by the part 41, the feeler drops and resumes its guiding position while the safety member 17a resumes its vertical position in the slot 1a and is again locked in the automatic steering position both by the contact between the lever 38 and the stop 39 and by the engagement of the parts 41 and 42.

In the case of a safety member such as that of Figure 7, the arrangement is similar except that the part 40 is fixed to the bar 11a by a fork so as to leave sufficient space for the oscillations of the part 3b, 15 about the pin 16. In such a case, the ends of the fork of the part 40 are fixed to the bar 11a beyond the stops 13.

Finally, in the case of a safety member such as those of Figures 6 and 8 and taking into account what has been said above, the trolley has to be slightly modified by the use of rollers in the general form of pulleys, that is to say having two lateral flanges adapted to straddle the rail 1b similarly to the head 17b. Such modifications are easy to understand and do not need to be illustrated.

I claim:
1. A safety device for a vehicle automatically guided by a reference track, said safety device comprising an alarm signal, a shaft fixed beneath the floor of the vehicle, and transverse to the longitudinal axis of the vehicle, two stops fixed to said shaft at spaced-apart points situated a little beyond predetermined limiting positions, a member mounted on said vehicle and movable between and into contact with the stops and having extension means to engage the reference track to move said member between said spaced apart stops, an electric circuit comprising a source of current having one pole connected to a terminal of the alarm signal and another pole connected in parallel to each of said stops, and an electrical connection between said member and the other terminal of the alarm signal so that the circuit will be closed when said extension means in engagement with the reference track moves said member into contact with either of said stops to actuate the alarm signal.

2. A safety device as set forth in claim 1 wherein the member having extension means is slidably mounted on the shaft.

3. A safety device as set forth in claim 1 wherein the member having extension means is pivotally mounted on the shaft for movement about an axis contained in the longitudinal vertical plane of symmetry of the vehicle.

4. A safety device as set forth in claim 1 for use on a vehicle guided by a trolley which engages the reference track ahead of the extension means and is pivotally mounted on the vehicle through a guide rod wherein the shaft is mounted so that it can pivot beneath the chassis of the vehicle, comprising means for releasably coupling the extension means and the guide rod, and means on the guide rod for lifting and lowering the trolley and the extension means together.

5. A safety device for a vehicle guided by a reference track, said safety device comprising an alarm signal having a pair of terminals, two electrical contacts spaced apart from each other a predetermined distance and mounted on said vehicle, extension means movably mounted on said vehicle and engageable with said reference track, a third electrical contact mounted on said extension means and movable therewith between and into engagement with said two electrical contacts in response to the movement of said extension means, an electrical circuit comprising a source of electric current having one pole connected to one terminal of the alarm signal and another pole connected to said third contact, and an electrical connection between each of said two electrical contacts and the other terminal of said alarm signal so that the circuit will be closed to actuate the alarm signal when the third electrical contact comes into contact with either of said two contacts.

References Cited in the file of this patent

UNITED STATES PATENTS

| 1,068,249 | Kimelman | July 22, 1913 |
| 1,613,252 | St. Jacques | Jan. 4, 1927 |
| 2,099,720 | Billner | Nov. 23, 1937 |
| 2,391,228 | Day | Dec. 18, 1945 |
| 2,468,158 | Bartholomew | Apr. 26, 1949 |

FOREIGN PATENTS

| 102,385 | Great Britain | Mar. 29, 1917 |
| 708,187 | Great Britain | Apr. 28, 1954 |